(12) United States Patent
Nakatani et al.

(10) Patent No.: US 12,018,946 B2
(45) Date of Patent: Jun. 25, 2024

(54) APPARATUS, METHOD, AND COMPUTER PROGRAM FOR IDENTIFYING ROAD BEING TRAVELED

(71) Applicant: TOYOTA JIDOSHA KABUSHIKI KAISHA, Toyota (JP)

(72) Inventors: Toshihiro Nakatani, Tokyo (JP); Yasutaka Teramae, Kawasaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 154 days.

(21) Appl. No.: 17/656,575

(22) Filed: Mar. 25, 2022

(65) Prior Publication Data

US 2022/0307840 A1 Sep. 29, 2022

(30) Foreign Application Priority Data

Mar. 26, 2021 (JP) .................... 2021-053863

(51) Int. Cl.
*G01C 21/30* (2006.01)
*G06V 20/56* (2022.01)

(52) U.S. Cl.
CPC .......... *G01C 21/30* (2013.01); *G06V 20/588* (2022.01)

(58) Field of Classification Search
CPC .............................. G01C 21/30; G06V 20/588
See application file for complete search history.

(56) References Cited

U.S. PATENT DOCUMENTS

| | | | |
|---|---|---|---|
| 9,720,412 B1* | 8/2017 | Zhu | B60W 30/18159 |
| 11,687,050 B2* | 6/2023 | Neeld | G06Q 10/08 |
| | | | 700/276 |
| 2017/0021863 A1* | 1/2017 | Thompson | G06V 20/588 |
| 2018/0180422 A1* | 6/2018 | Naito | G01C 21/30 |
| 2020/0064138 A1* | 2/2020 | Takahama | G01C 21/3667 |
| 2020/0249031 A1 | 8/2020 | Ewert | |
| 2021/0055115 A1* | 2/2021 | Kawabata | G01C 21/3602 |
| 2021/0064057 A1* | 3/2021 | Eldar | G01C 21/3602 |
| 2021/0304433 A1* | 9/2021 | Huang | G01S 19/393 |
| 2022/0236064 A1 | 7/2022 | Takeda et al. | |

FOREIGN PATENT DOCUMENTS

| | | | |
|---|---|---|---|
| JP | 2009287925 A | 12/2009 | |
| JP | 2012098997 A | 5/2012 | |
| JP | 2018059742 A | 4/2018 | |
| JP | 2018169206 A | 11/2018 | |
| JP | 2020126048 A | 8/2020 | |
| WO | 2020/240243 A1 | 12/2020 | |

* cited by examiner

*Primary Examiner* — Seth A Silverman
(74) *Attorney, Agent, or Firm* — Dickinson Wright, PLLC

(57) ABSTRACT

An apparatus for identifying a road being traveled includes one or more processors configured to: compare a latest predetermined section of a trajectory of a vehicle with a first map representing roads to detect a section closest to a current position of the vehicle included in a road that matches the trajectory the best of the roads represented in the first map as a candidate for a road being traveled by the vehicle, compare a sensor signal representing environment around the vehicle with a second map representing individual lanes on roads to detect a lane being traveled by the vehicle, identify the candidate for the road as the road being traveled by the vehicle when the detected lane is included in the candidate, and identify a road including the detected lane as the road being traveled by the vehicle when the detected lane is not included in the candidate.

6 Claims, 5 Drawing Sheets

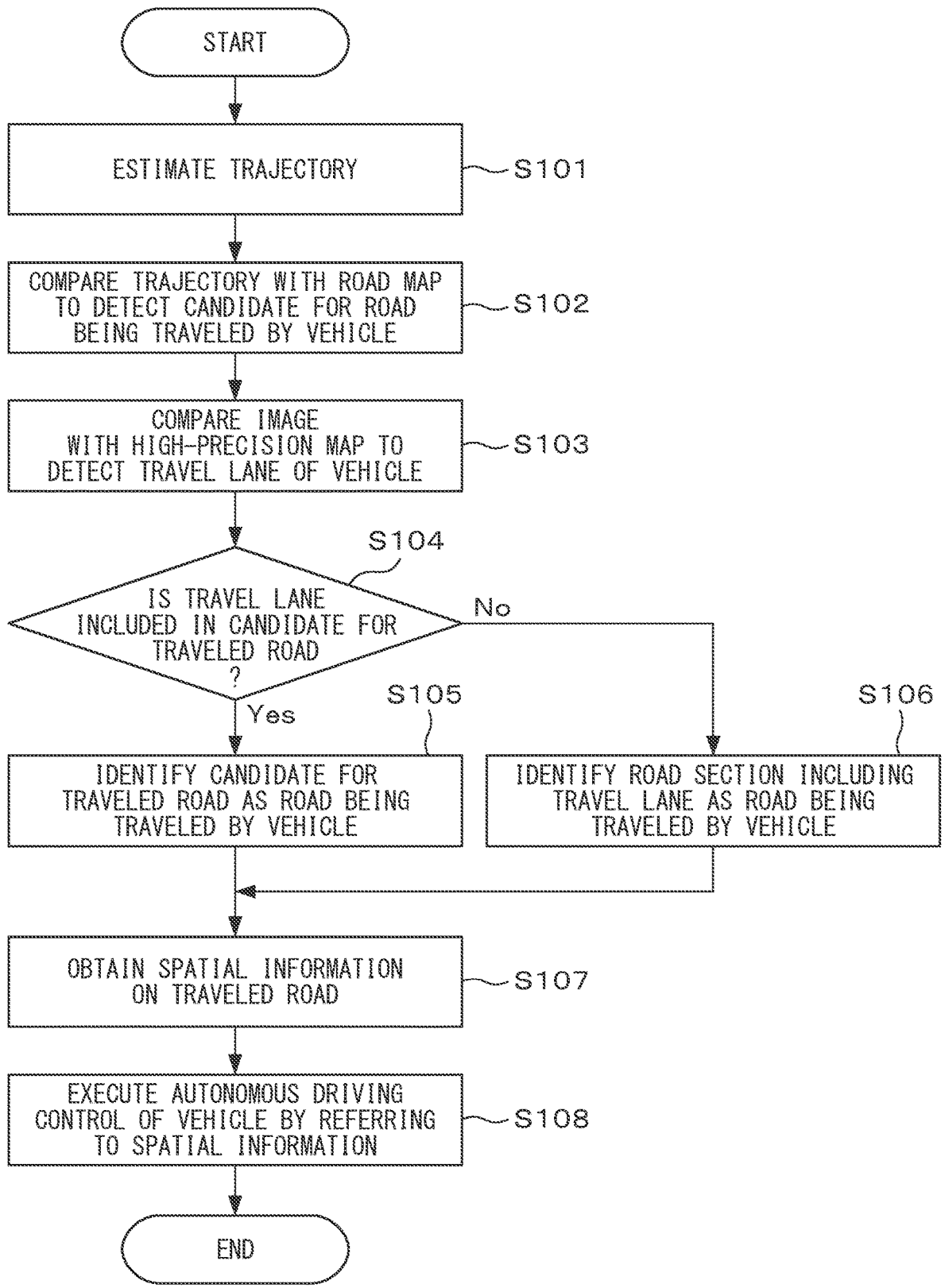

APPARATUS, METHOD, AND COMPUTER PROGRAM FOR IDENTIFYING ROAD BEING TRAVELED

FIELD

The present invention relates to an apparatus, a method, and a computer program for identifying a road being traveled by a vehicle.

BACKGROUND

Appropriate autonomous driving control of a vehicle requires correct detection of a road being traveled by the vehicle. Thus, a technique for identifying a road being traveled by a vehicle by a comparison between the trajectory of the vehicle and map information has been proposed (see Japanese Unexamined Patent Publication No. 2020-126048).

A method for determining a position of a vehicle in a digital map described in Japanese Unexamined Patent Publication No. 2020-126048 includes determining course information that is characteristic of the course of a stretch of road traveled by the vehicle, using motion information about the motion of the vehicle; and matching the course information to map information that is characteristic of the course of roads stored in a digital map.

SUMMARY

A road different from the road being actually traveled by a vehicle may be erroneously detected by a comparison between the trajectory of the vehicle and a map as the road being traveled by the vehicle, depending on the accuracy of information used for calculating the trajectory or on the road being traveled and the surrounding environment. In such a case, a vehicle controller that executes autonomous driving control of a vehicle cannot use correct information on the road being traveled by the vehicle, which may cause trouble with the autonomous driving control.

It is an object of the present invention to provide an apparatus that can accurately identify a road being traveled by a vehicle.

According to an embodiment, an apparatus for identifying a road being traveled is provided. The apparatus includes one or more processors configured to: compare a latest predetermined section of a trajectory of a vehicle with a first map representing roads to detect a section closest to a current position of the vehicle included in a road that matches the trajectory the best of the roads represented in the first map as a candidate for a road being traveled by the vehicle, compare a sensor signal representing environment around the vehicle with a second map representing individual lanes on roads to detect a lane being traveled by the vehicle, the sensor signal being obtained by a sensor mounted on the vehicle, identify the candidate for the road as the road being traveled by the vehicle when the detected lane is included in the candidate, and identify a road including the detected lane as the road being traveled by the vehicle when the detected lane is not included in the candidate.

Preferably, the processors of the apparatus are further configured to calculate a first confidence score indicating the degree of reliability of the candidate for the road, and calculate a second confidence score indicating the degree of reliability of the detected lane, and the processor identifies the road including the detected lane as the road being traveled by the vehicle only if the second confidence score is higher than the first confidence score.

Preferably, of the roads represented in the first map, the processors of the apparatus detect a road whose degree of matching with the trajectory is equal to or higher than a predetermined matching threshold as a candidate for the road being traveled by the vehicle, and when a plurality of candidates for the road is detected, the processors identify one of the plurality of candidates including the detected lane being traveled by the vehicle as the road being traveled by the vehicle.

Alternatively, the processors of the apparatus preferably identify the road including the detected lane as the road being traveled by the vehicle when no candidate for the road is detected.

According to another embodiment, a method for identifying a road being traveled is provided. The method includes: comparing a latest predetermined section of a trajectory of a vehicle with a first map representing roads to detect a section closest to a current position of the vehicle included in a road that matches the trajectory the best of the roads represented in the first map as a candidate for a road being traveled by the vehicle; and comparing a sensor signal representing environment around the vehicle with a second map representing individual lanes on roads to detect a lane being traveled by the vehicle. The sensor signal is obtained by a sensor mounted on the vehicle. The method further includes identifying the candidate for the road as the road being traveled by the vehicle when the detected lane is included in the candidate; and identifying a road including the detected lane as the road being traveled by the vehicle when the detected lane is not included in the candidate.

According to still another embodiment, a non-transitory recording medium that stores a computer program for identifying a road being traveled is provided. The computer program includes instructions causing a processor mounted on a vehicle to execute a process including: comparing a latest predetermined section of a trajectory of the vehicle with a first map representing roads to detect a section closest to a current position of the vehicle included in a road that matches the trajectory the best of the roads represented in the first map as a candidate for a road being traveled by the vehicle; and comparing a sensor signal representing environment around the vehicle with a second map representing individual lanes on roads to detect a lane being traveled by the vehicle. The sensor signal is obtained by a sensor mounted on the vehicle. The process further includes identifying the candidate for the road as the road being traveled by the vehicle when the detected lane is included in the candidate; and identifying a road including the detected lane as the road being traveled by the vehicle when the detected lane is not included in the candidate.

The apparatus according to the present invention has an advantageous effect of being able to accurately identify a road being traveled by a vehicle.

BRIEF DESCRIPTION OF DRAWINGS

FIG. 5 is an operation flowchart of the road identification process.

DESCRIPTION OF EMBODIMENTS

An apparatus for identifying a road being traveled as well as a method and a computer program therefor executed by the apparatus will now be described with reference to the attached drawings. The apparatus determines a latest predetermined section of a trajectory of a vehicle, based on a vehicle motion signal obtained by a sensor for obtaining information on motion of the vehicle, such as a wheel speed sensor or a gyro sensor. The apparatus further compares the latest predetermined section of the trajectory with a first map representing roads to identify a road that matches the trajectory the best of the roads represented in the map. Then the apparatus identifies a section closest to a current position of the vehicle included in the identified road as a candidate for a road being traveled by the vehicle (hereafter simply a "traveled road"). The apparatus further compares a sensor signal representing environment around the vehicle, which is obtained by a sensor mounted on the vehicle, with a second map representing individual lanes on roads to detect a lane being traveled by the vehicle (hereafter simply a "travel lane"). When the detected travel lane is included in the candidate for the traveled road, the apparatus identifies the candidate as the traveled road. In contrast, when the detected travel lane is not included in the candidate for the traveled road, the apparatus identifies a road including the travel lane as the traveled road. In this way, the apparatus improves the accuracy of detection of the road being traveled by the vehicle, using the result of detection of the travel lane for identifying the traveled road.

Figure 1:
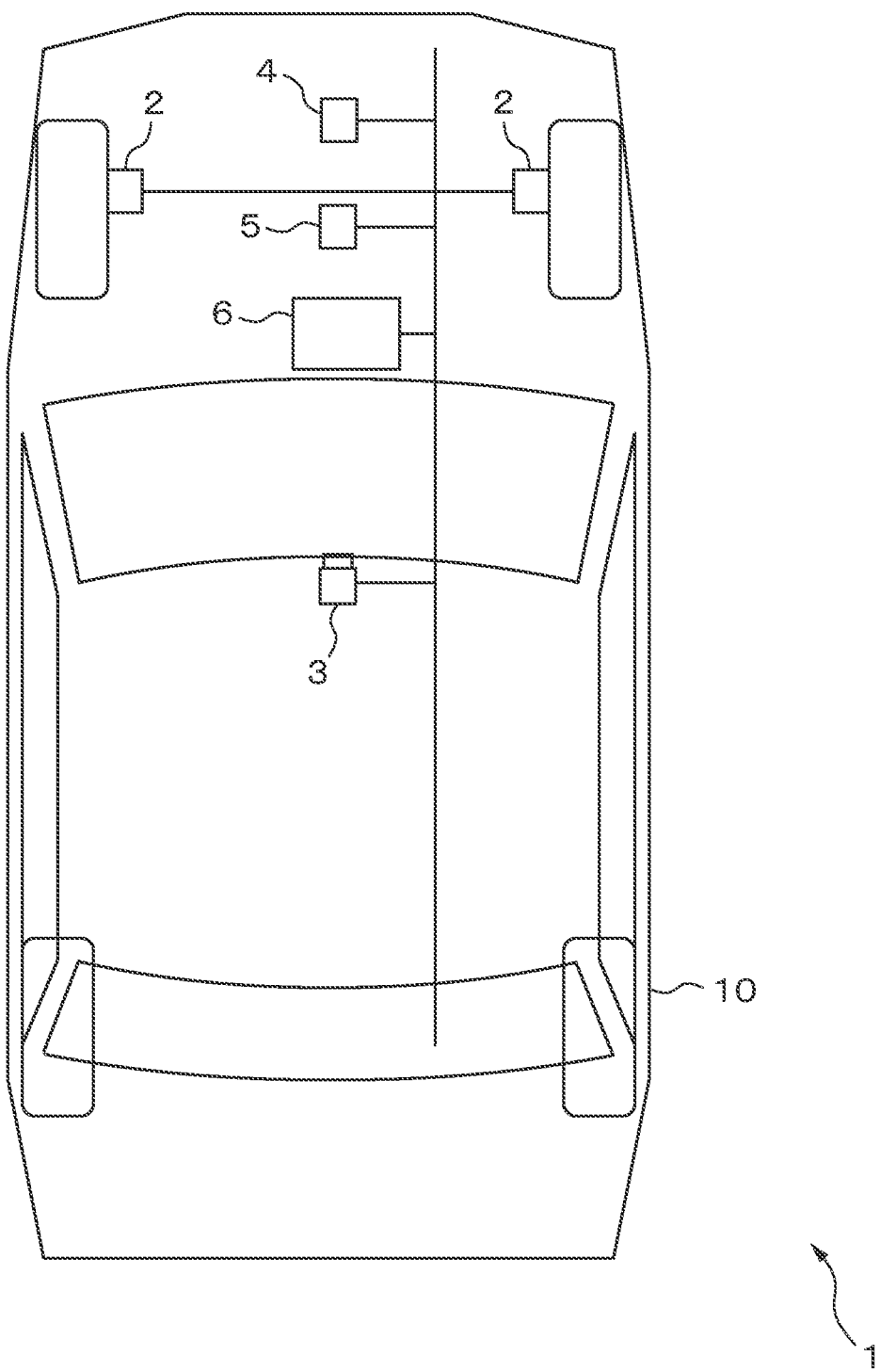
FIG. 1 schematically illustrates the configuration of a vehicle control system equipped with an apparatus for identifying a road being traveled.
Figure 2:
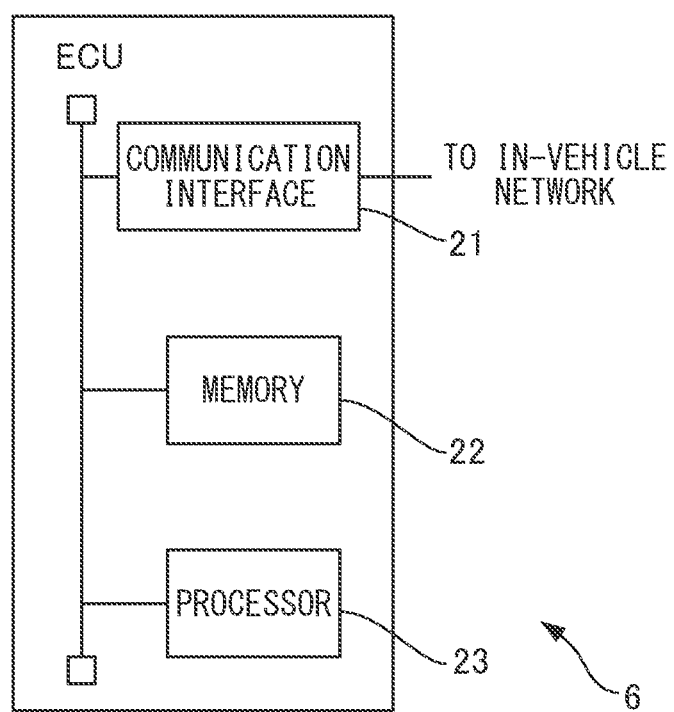
FIG. 2 illustrates the hardware configuration of an electronic control unit, which is an embodiment of the apparatus for identifying a road being traveled.

FIG. 1 schematically illustrates the configuration of a vehicle control system equipped with the apparatus for identifying a road being traveled. FIG. 2 illustrates the hardware configuration of an electronic control unit, which is an embodiment of the apparatus for identifying a road being traveled. In the present embodiment, the vehicle control system 1, which is mounted on a vehicle 10 and controls the vehicle 10, includes at least one vehicle motion sensor 2, a camera 3, a distance sensor 4, a storage device 5, and an electronic control unit (ECU) 6, which is an example of the apparatus for identifying a road being traveled. The vehicle motion sensor 2, the camera 3, the distance sensor 4, and the storage device 5 are connected to the ECU 6 via an in-vehicle network conforming to a standard, such as a controller area network, so that they can communicate with each other. The vehicle control system 1 may further include a navigation device (not illustrated) for searching for a planned travel route to a destination; a wireless communication device (not illustrated) for wireless communication with another device; and a receiver (not illustrated) for determining the position of the vehicle 10, based on positioning signals from a satellite positioning system, such as GPS.

The vehicle motion sensor 2, which is an example of a motion measuring unit, obtains information on motion of the vehicle 10 and generates a vehicle motion signal indicating this information. The information on motion of the vehicle 10 is, for example, the wheel speed, the angular velocities of the vehicle 10 around three mutually perpendicular axes, or the acceleration of the vehicle 10. The vehicle motion sensor 2 includes, for example, at least one of the following: a wheel speed sensor for measuring the wheel speed of the vehicle 10, a gyro sensor for measuring the angular velocities of the vehicle 10 around three mutually perpendicular axes, and an acceleration sensor for measuring the acceleration of the vehicle 10. The vehicle motion sensor 2 generates vehicle motion signals at predetermined intervals, and outputs the generated vehicle motion signals to the ECU 6 via the in-vehicle network.

The camera 3, which is an example of a sensor for generating a sensor signal representing environment around the vehicle 10, includes a two-dimensional detector constructed from an array of optoelectronic transducers, such as CCD or C-MOS, having sensitivity to visible light and a focusing optical system that forms an image of a target region on the two-dimensional detector. The camera 3 is mounted, for example, in the interior of the vehicle 10 so as to be oriented, for example, to the front of the vehicle 10. The camera 3 captures a region in front of the vehicle 10 every predetermined capturing period (e.g., 1/30 to 1/10 seconds), and generates images representing this region. The images obtained by the camera 3, each of which is an example of the sensor signal, may be color or grayscale images. The vehicle 10 may include multiple cameras taking pictures in different orientations or having different focal lengths.

Whenever generating an image, the camera 3 outputs the generated image to the ECU 6 via the in-vehicle network.

The distance sensor 4 is another example of a sensor for generating a sensor signal representing environment around the vehicle 10, such as LiDAR or radar. For each direction in its measurement area, the distance sensor 4 measures the distance from the vehicle 10 to an object located in this direction in an area around the vehicle 10 at predetermined intervals, and generates ranging signals indicating the results of measurement. Each of the ranging signals obtained by the distance sensor 4 is another example of the sensor signal.

Whenever generating a ranging signal, the distance sensor 4 outputs the generated ranging signal to the ECU 6 via the in-vehicle network.

The storage device 5, which is an example of a storage unit, includes, for example, at least one of the following: a hard disk drive, a nonvolatile semiconductor memory, and an optical recording medium and an access device therefor. The storage device 5 contains a high-precision map, which is an example of the second map representing individual lanes on roads. Spatial information included in the high-precision map includes information on features that affect travel of the vehicle for each section of roads included in a predetermined region represented in this map. The features that affect travel of the vehicle include, for example, road markings such as lane-dividing lines demarcating individual lanes, signposts, and structures such as roadside noise-blocking walls. The high-precision map, which includes information for identifying individual lanes, such as lane-dividing lines, can represent individual lanes on roads. The high-precision map may include spatial information only on a particular type of roads, e.g., expressways.

Upon receiving a request from the ECU 6 to read out the high-precision map, the storage device 5 reads out spatial information on the traveled road at the current position of the vehicle 10 and other roads within a predetermined area around the traveled road from the stored high-precision map. The storage device 5 outputs the read-out spatial information to the ECU 6 via the in-vehicle network.

The ECU 6 controls travel of the vehicle 10 to automatically drive it. Additionally, the ECU 6 executes a road identification process to obtain from the storage device 5 spatial information related to the traveled road and used in autonomous driving control of the vehicle 10.

As illustrated in FIG. 2, the ECU 6 includes a communication interface 21, a memory 22, and a processor 23. The communication interface 21, the memory 22, and the processor 23 may be separate circuits or a single integrated circuit.

The communication interface 21 includes an interface circuit for connecting the ECU 6 to the in-vehicle network. Whenever receiving a vehicle motion signal from the vehicle motion sensor 2, the communication interface 21 passes the vehicle motion signal to the processor 23. Whenever receiving an image from the camera 3, the communication interface 21 passes the received image to the processor 23. Whenever receiving a ranging signal from the distance sensor 4, the communication interface 21 passes the received ranging signal to the processor 23. Additionally, the communication interface 21 passes spatial information read from the storage device 5 to the processor 23.

The memory 22, which is another example of a storage unit, includes, for example, volatile and nonvolatile semiconductor memories. The memory 22 contains various types of data used in a vehicle control process including the road identification process executed by the processor 23 of the ECU 6. For example, the memory 22 contains a map representing roads (hereafter simply a "road map"). The road map, which is an example of the first map, is used, for example, for searching for a route by the navigation device and includes identification information on individual road sections (link IDs) as well as information indicating the positions, shapes, and types (e.g., expressways or ordinary roads) of the road sections, and the connection relationship therebetween. The memory 22 further contains vehicle motion signals, images of the surroundings of the vehicle 10, and ranging signals received in a preceding predetermined period from the vehicle motion sensor 2, the camera 3, and the distance sensor 4, respectively, and spatial information read from the storage device 5 in this period. Additionally, the memory 22 contains parameters indicating the focal length, angle of view, orientation, and mounted position of the camera 3; and a set of parameters for specifying a classifier used for detecting, for example, lane-dividing lines. Additionally, the memory 22 temporarily contains various types of data generated during the vehicle control process.

The processor 23 includes one or more central processing units (CPUs) and a peripheral circuit thereof. The processor 23 may further include another operating circuit, such as a logic-arithmetic unit, an arithmetic unit, or a graphics processing unit. The processor 23 executes the vehicle control process including the road identification process on the vehicle 10 at predetermined intervals.

Figure 3:
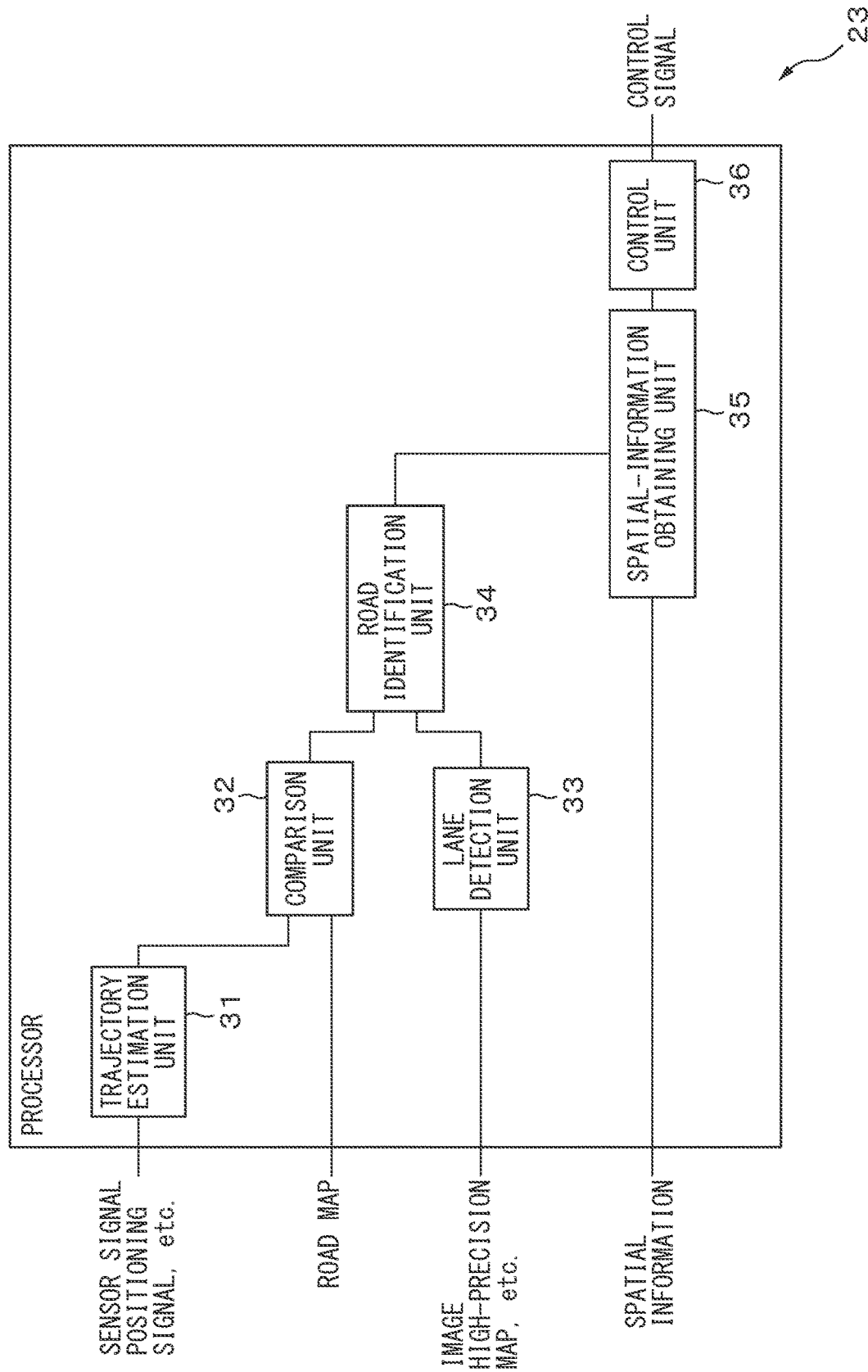
FIG. 3 is a functional block diagram of a processor of the electronic control unit, related to a road identification process.

FIG. 3 is a functional block diagram of the processor 23, related to the vehicle control process including the road identification process. The processor 23 includes a trajectory estimation unit 31, a comparison unit 32, a lane detection unit 33, a road identification unit 34, a spatial-information obtaining unit 35, and a control unit 36. These units included in the processor 23 are, for example, functional modules implemented by a computer program executed on the processor 23, or may be dedicated operating circuits provided separately. Of these units included in the processor 23, the trajectory estimation unit 31, the comparison unit 32, the lane detection unit 33, and the road identification unit 34 relate to the road identification process.

The trajectory estimation unit 31 estimates a trajectory of the vehicle 10 in a preceding predetermined period (i.e., a latest predetermined section of the trajectory of the vehicle 10) at predetermined intervals, based on vehicle motion signals obtained from the vehicle motion sensor 2. For example, the trajectory estimation unit 31 can estimate the trajectory of the vehicle 10 by integrating the wheel speeds and the angular velocities around the respective axes represented by the vehicle motion signals over the predetermined period. In the case that the vehicle 10 includes a receiver of a satellite positioning system, the trajectory estimation unit 31 may estimate the trajectory of the vehicle 10 by arranging the positions of the vehicle 10 represented by positioning signals received by the receiver in the preceding predetermined period in chronological order. The trajectory estimation unit 31 outputs the estimated trajectory to the comparison unit 32.

Whenever receiving the trajectory of the vehicle 10 from the trajectory estimation unit 31, the comparison unit 32 compares the trajectory with the road map to detect a candidate for the road being traveled by the vehicle 10. For example, the comparison unit 32 calculates the degree of matching between the trajectory and a road represented in the road map while changing the position and direction of the trajectory relative to the road map. Of the individual road sections included in a road in the map whose degree of matching is a maximum, the comparison unit 32 detects a road section on the trajectory closest to the current position of the vehicle 10 as a candidate for the road being traveled by the vehicle 10.

For example, when calculating the degree of matching, the comparison unit 32 divides the trajectory into multiple sections and calculates the distance to the nearest road section in the road map for each section of the trajectory. The comparison unit 32 calculates the inverse of the sum of the distances calculated for the respective sections of the trajectory as the degree of matching. Alternatively, the comparison unit 32 may calculate the inverse of the sum of squares of the distances calculated for the respective sections of the trajectory as the degree of matching. Alternatively, the comparison unit 32 may use the inverse of a value obtained by adding a predetermined positive constant to the sum of the distances or that of squares of the distances as the degree of matching.

Since the sections of the trajectory of the vehicle 10 should be continuous, the comparison unit 32 may limit the road sections in the road map for which the degree of matching is calculated to continuous sections. Additionally, the comparison unit 32 may limit the target area of the road map for calculating the degree of matching with the trajectory so as to include the current position of the vehicle 10 indicated by a positioning signal received from a receiver of a satellite positioning system mounted on the vehicle 10 or the traveled road detected at the previous comparison. This will reduce the amount of computation required to detect the traveled road.

When the maximum degree of matching is less than a predetermined threshold, the comparison unit 32 may determine that no candidate for the traveled road can be detected.

The comparison unit 32 notifies information indicating the detected candidate for the traveled road to the road identification unit 34. The information indicating the detected candidate for the traveled road includes the link ID and the type of road of the road section corresponding to the candidate for the traveled road.

Whenever receiving an image from the camera 3, the lane detection unit 33 compares the image with the high-precision map to detect the travel lane of the vehicle 10. At this comparison, the lane detection unit 33 uses the spatial information read at the previous identification of the traveled road.

The lane detection unit 33 inputs the image into a classifier to detect features on or near the road represented in the image. As such a classifier, the lane detection unit 33 may use, for example, a deep neural network (DNN) having a convolutional neural network (CNN) architecture, e.g., Single Shot MultiBox Detector (SSD) or Faster R-CNN. Such a classifier is trained in advance to detect a detection target feature from an image. With an assumption about the position and orientation of the vehicle 10, the lane detection unit 33 projects features detected from the image onto the high-precision map or features on or near the road around the vehicle 10 in the high-precision map onto the image by referring to parameters of the camera 3. Then, the lane detection unit 33 estimates the current position and orientation of the vehicle 10 to be the position and orientation of the vehicle 10 for the case that the features detected from the image best match those indicated by spatial information in the high-precision map. Of the individual lanes represented in the high-precision map, the lane detection unit 33 detects the lane including the estimated current position of the vehicle 10 as the travel lane. Additionally, the lane detection unit 33 calculates the inverse of the sum of the distances between the respective features detected from the image and the corresponding features in the high-precision map as the degree of matching. Alternatively, the lane detection unit 33 may calculate the inverse of the sum of squares of the distances between the respective features detected from the image and the corresponding features in the high-precision map as the degree of matching. Alternatively, the lane detection unit 33 may use the inverse of a value obtained by adding a predetermined positive constant to the sum of the distances or that of squares of the distances as the degree of matching.

The lane detection unit 33 identifies a road section including the detected travel lane by referring to the high-precision map. The lane detection unit 33 notifies the road identification unit 34 of the link ID of the road section including the travel lane and the degree of matching calculated for the travel section. The lane detection unit 33 also notifies the control unit 36 of the positions of the detected travel lane and the vehicle 10.

The road identification unit 34 identifies the road being traveled by the vehicle 10, based on whether the travel lane detected by the lane detection unit 33 is included in the candidate for the traveled road identified by the comparison unit 32. In the present embodiment, when the detected travel lane is included in the candidate for the traveled road, the road identification unit 34 identifies the candidate as the traveled road. In contrast, when the detected travel lane is not included in the candidate for the traveled road, the road identification unit 34 identifies the road section including the detected travel lane as the road being traveled by the vehicle 10. The road identification unit 34 determines that the detected travel lane is included in the candidate for the traveled road, when the link ID of the road section including the detected travel lane matches that of the candidate. In contrast, the road identification unit 34 determines that the detected travel lane is not included in the candidate for the traveled road, when the link ID of the road section including the detected travel lane differs from that of the candidate.

Figure 4:
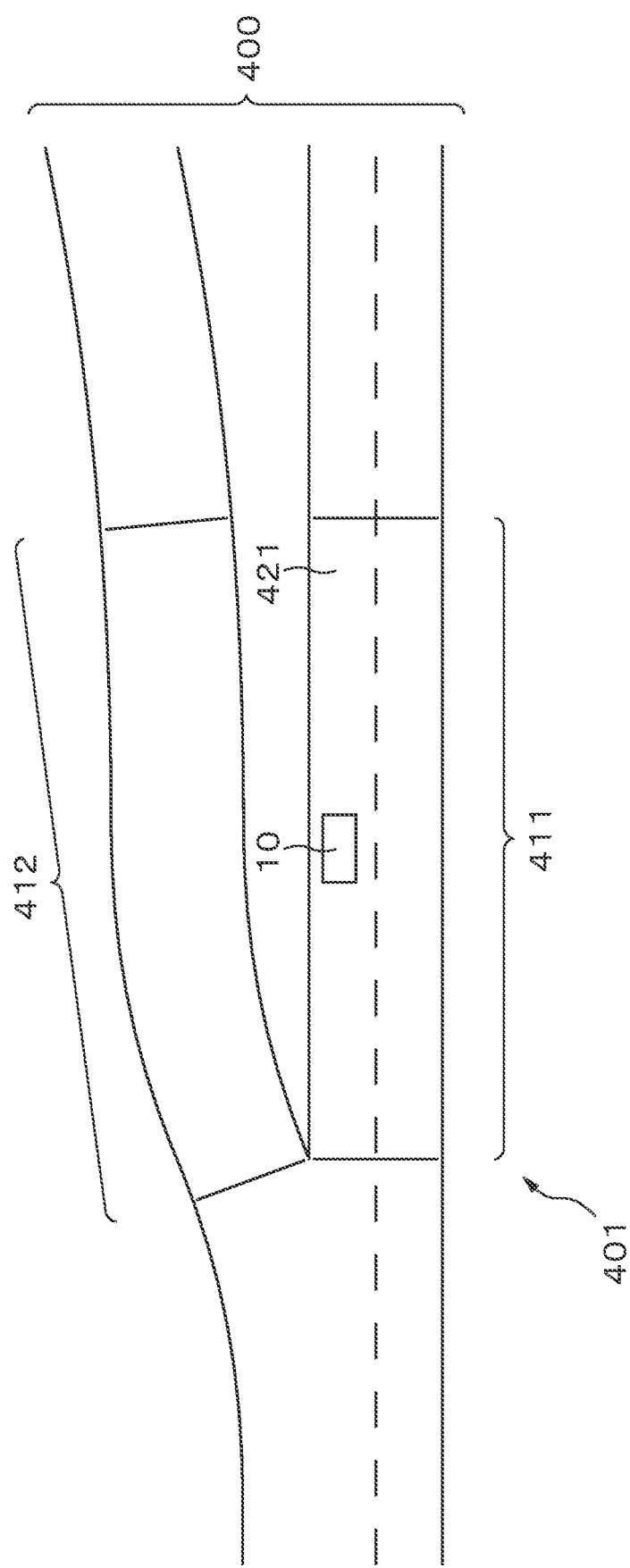
FIG. 4 is a schematic diagram for explaining identification of a traveled road according to the embodiment.

FIG. 4 is a schematic diagram for explaining identification of a traveled road according to the embodiment. In the example illustrated in FIG. 4, a road 400 bifurcates at a bifurcation point 401. The vehicle 10 is traveling on a lane 421 included in a section 411 of the road 400, which is one of the two road sections beyond the bifurcation point 401 in the travel direction of the vehicle. Thus the lane 421 is detected as the travel lane. Assume that a section 412, which is the other of the two road sections beyond the bifurcation point 401, is detected as a candidate for the traveled road. In this case, since the lane 421 is not included in the section 412, which is the candidate for the traveled road, the section 412 is not identified as the traveled road. The section 411 including the lane 421 is identified as the traveled road. In the case that the section 411 is detected as a candidate for the traveled road, the section 411 is identified as the traveled road because the section 411 includes the lane 421 detected as the travel lane.

The road identification unit 34 notifies the spatial-information obtaining unit 35 of information indicating the identified traveled road, e.g., the link ID of the traveled road.

Whenever being notified by the road identification unit 34 of information indicating a traveled road, the spatial-information obtaining unit 35 obtains spatial information on a predetermined area including the traveled road indicated by the information notified thereto from the storage device 5. The predetermined area may be, for example, an area sufficient for estimating the position of the vehicle 10 and setting a trajectory to be traveled by the vehicle 10 in a section from the current position to a predetermined distance away (hereafter, a "planned trajectory"), e.g., an area within several hundred meters to several kilometers of the traveled road. Whenever obtaining spatial information, the spatial-information obtaining unit 35 temporarily stores the obtained spatial information in the memory 22.

The control unit 36 executes autonomous driving control of the vehicle 10 by referring to spatial information when the driver has instructed autonomous driving control to be applied with a selector switch (not illustrated) provided in the interior of the vehicle 10.

In the present embodiment, when the vehicle 10 is under autonomous driving control, the control unit 36 sets a planned trajectory so that the vehicle 10 will travel along the travel lane detected by the lane detection unit 33 by referring to spatial information. The control unit 36 further identifies a target lane toward a destination of the vehicle 10 by referring to spatial information. When the travel lane differs from the target lane, the control unit 36 sets a planned trajectory so as to make a lane change from the travel lane to the target lane.

Upon setting a planned trajectory, the control unit 36 executes autonomous driving control of the vehicle 10 so that it will travel along the planned trajectory. For example, the control unit 36 determines the steering angle for the vehicle 10 to travel along the planned trajectory by referring to the current position of the vehicle 10 and the planned trajectory, and outputs a control signal depending on the steering angle to an actuator (not illustrated) that controls the steering wheel of the vehicle 10. The control unit 36 also determines target acceleration of the vehicle 10 according to a target speed thereof set with a selector switch in the interior of the vehicle and its current speed measured by a vehicle speed sensor (not illustrated), and sets the degree of accelerator opening or the amount of braking so that the acceleration of the vehicle 10 will be equal to the target acceleration. The control unit 36 then determines the amount of fuel injection according to the set degree of accelerator opening, and outputs a control signal depending on the amount of fuel injection to a fuel injector of an engine of the vehicle 10. Alternatively, the control unit 36 determines the electric power to be supplied to a motor of the vehicle 10 according to the set degree of accelerator opening, and outputs a control signal depending on the electric power to a driver of the motor. Additionally, the control unit 36 outputs a control signal depending on the set amount of braking to the brake of the vehicle 10.

FIG. 5 is an operation flowchart of the vehicle control process including the road identification process executed by the processor 23. The processor 23 may execute the vehicle control process in accordance with this operation flowchart at predetermined intervals. In the operation flowchart, the process of steps S101 to S106 relates to the road identification process.

The trajectory estimation unit 31 of the processor 23 estimates a latest predetermined section of a trajectory of the vehicle 10 (step S101). The comparison unit 32 of the processor 23 compares the trajectory with the road map to detect a road section closest to the current position of the vehicle 10 in a road that matches the trajectory the best as a candidate for the road being traveled by the vehicle 10 (step S102).

The lane detection unit 33 of the processor 23 compares an image received from the camera 3 with the high-precision map to detect the travel lane of the vehicle 10 (step S103). The road identification unit 34 of the processor 23 determines whether the travel lane detected by the lane detection unit 33 is included in the candidate for the traveled road identified by the comparison unit 32 (step S104).

When the detected travel lane is included in the candidate for the traveled road (Yes in step S104), the road identification unit 34 identifies the candidate as the traveled road (step S105). In contrast, when the detected travel lane is not included in the candidate for the traveled road (No in step S104), the road identification unit 34 identifies a road section including the detected travel lane as the road being traveled by the vehicle 10 (step S106).

Upon identifying the traveled road, the spatial-information obtaining unit 35 of the processor 23 obtains spatial information on a predetermined area including the traveled road from the storage device 5 (step S107). The control unit 36 of the processor 23 executes autonomous driving control of the vehicle 10 by referring to the spatial information (step S108). Then the processor 23 terminates the vehicle control process.

As has been described above, the apparatus for identifying a road being traveled compares a latest predetermined section of the trajectory of a vehicle with a road map to detect a candidate for a road being traveled by the vehicle. The apparatus further compares a sensor signal representing environment around the vehicle, which is obtained by a sensor mounted on the vehicle, with a high-precision map to detect a travel lane of the vehicle. When the detected travel lane is included in the candidate for the traveled road, the apparatus identifies the candidate as the traveled road. In contrast, when the detected travel lane is not included in the candidate for the traveled road, the apparatus identifies a road including the travel lane as the traveled road. In this way, the apparatus can improve the accuracy of detection of the traveled road, using the result of detection of the travel lane, which is obtained by referring to the high-precision map including lane-by-lane information, for identifying the traveled road.

According to a modified example, the road identification unit 34 may identify the road including the travel lane as the traveled road only if the degree of matching of the travel lane calculated by the lane detection unit 33 is higher than that of the candidate for the traveled road calculated by the comparison unit 32. As the degree of matching calculated for the candidate for the traveled road is higher, the possibility that the candidate is the traveled road is expected to increase; thus, this degree of matching is an example of the first confidence score indicating the degree of reliability of the candidate for the road. Similarly, as the degree of matching calculated for the detected travel lane is higher, the possibility that the detected travel lane is the lane being actually traveled by the vehicle 10 is expected to increase; thus this degree of matching is an example of the second confidence score indicating the degree of reliability of the detected travel lane. In this way, the road identification unit 34 can prevent erroneous identification of the traveled road caused by erroneous detection of the travel lane in the case that the accuracy of detection of the travel lane is lower than that of the candidate for the traveled road. In the case that the degree of matching of the travel lane is lower than that of the candidate for the traveled road and that the travel lane is not included in the candidate for the traveled road, the road identification unit 34 may determine that the traveled road cannot be identified.

According to another modified example, for each road represented in the road map whose degree of matching with the trajectory is equal to or higher than a predetermined matching threshold, the comparison unit 32 may detect the road section closest to the current position of the vehicle 10 included in the road as a candidate for the traveled road. When a plurality of candidates for the traveled road is detected, the road identification unit 34 may identify one of the candidates including the detected travel lane as the traveled road. In this way, the road identification unit 34 can identify the traveled road even when it is difficult to identify the traveled road by a comparison between the trajectory and the road map.

According to still another modified example, the road identification unit 34 may identify the road including the travel lane detected by the lane detection unit 33 as the traveled road when the comparison unit 32 has failed to detect a candidate for the traveled road. In this case also, the road identification unit 34 can identify the traveled road even when it is difficult to identify the traveled road by a comparison between the trajectory and the road map.

According to yet another modified example, the lane detection unit 33 may determine the degree of reliability of the detected travel lane, based on an image obtained by the camera 3 or a ranging signal obtained by the distance sensor 4. The road identification unit 34 may identify the traveled road, based on the travel lane, in accordance with the embodiment or modified examples only if it is determined that the detected travel lane is reliable. In this way, the road identification unit 34 can prevent erroneous identification of the traveled road caused by erroneous detection of the travel lane. The lane detection unit 33 determines the degree of reliability of the detected travel lane in accordance with any of the following techniques.

The lane detection unit 33 compares the number of lanes on the left or right side, which is the side of interest, of the travel lane detected from an image obtained by the camera 3 with that of lanes on the same side of the travel lane in the high-precision map. When they are equal, the lane detection unit 33 determines that the detected travel lane is reliable. In this case, the lane detection unit 33 can count the number of lanes on the side of interest of the travel lane by counting the number of lane-dividing lines on the side of interest detected from the image. The lane detection unit 33 may count the number of lanes on the side of interest in the high-precision map, based on the position of the detected travel lane and the number of lanes represented in the high-precision map at this position.

Alternatively, the lane detection unit 33 may determine the distance to a feature in an area around the vehicle 10 represented by a ranging signal (e.g., a noise-blocking wall) as the degree of reliability of the detected travel lane. In this case, the lane detection unit 33 may determine that the detected travel lane is reliable, when the difference between the distance to the feature represented by the ranging signal and the distance from the position of the detected travel lane to the feature in the high-precision map is within a predetermined error range.

A computer program for achieving the functions of the processor 23 of the ECU 6 according to the embodiment or modified examples may be provided in a form recorded on a computer-readable and portable medium, such as a semiconductor memory, a magnetic recording medium, or an optical recording medium.

As described above, those skilled in the art may make various modifications according to embodiments within the scope of the present invention.

What is claimed is:

1. An apparatus for identifying a road being traveled, comprising:
    one or more processors configured to:
        compare a latest predetermined section of a trajectory of a vehicle with a first map representing roads to detect a section closest to a current position of the vehicle included in a road that matches the trajectory the best of the roads represented in the first map as a candidate for a road being traveled by the vehicle,
        compare a sensor signal representing environment around the vehicle with a second map stored in a storage unit of the vehicle representing individual lanes among a plurality of lanes on roads to detect a lane being traveled by the vehicle, the sensor signal being obtained by a sensor mounted on the vehicle,
        identify the candidate for the road as the road being traveled by the vehicle when the detected lane is included in the candidate, and
        identify a road including the detected lane as the road being traveled by the vehicle when the detected lane is not included in the candidate.

2. The apparatus according to claim 1, wherein the processors are further configured to calculate a first confidence score indicating the degree of reliability of the candidate for the road, and calculate a second confidence score indicating the degree of reliability of the detected lane, and
    the processors identify the road including the detected lane as the road being traveled by the vehicle only if the second confidence score is higher than the first confidence score.

3. The apparatus according to claim 1, wherein, of the roads represented in the first map, the processors detect a road whose degree of matching with the trajectory is equal to or higher than a predetermined matching threshold as a candidate for the road being traveled by the vehicle, and
    when a plurality of candidates for the road is detected, the processor identifies one of the plurality of candidates including the detected lane being traveled by the vehicle as the road being traveled by the vehicle.

4. The apparatus according to claim 1, wherein the processors identify the road including the detected lane as the road being traveled by the vehicle when no candidate for the road is detected.

5. A method for identifying a road being traveled, comprising:
    comparing a latest predetermined section of a trajectory of a vehicle with a first map representing roads to detect a section closest to a current position of the vehicle included in a road that matches the trajectory the best of the roads represented in the first map as a candidate for a road being traveled by the vehicle;
    comparing a sensor signal representing environment around the vehicle with a second map stored in a storage unit of the vehicle representing individual lanes among a plurality of lanes on roads to detect a lane being traveled by the vehicle, the sensor signal being obtained by a sensor mounted on the vehicle;
    identifying the candidate for the road as the road being traveled by the vehicle when the detected lane is included in the candidate; and
    identifying a road including the detected lane as the road being traveled by the vehicle when the detected lane is not included in the candidate.

6. A non-transitory recording medium that stores a computer program for identifying a road being traveled, the computer program causing a processor mounted on a vehicle to execute a process comprising:
    comparing a latest predetermined section of a trajectory of the vehicle with a first map representing roads to detect a section closest to a current position of the vehicle included in a road that matches the trajectory the best of the roads represented in the first map as a candidate for a road being traveled by the vehicle;
    comparing a sensor signal representing environment around the vehicle with a second map stored in a storage unit of the vehicle representing individual lanes among a plurality of lanes on roads to detect a lane being traveled by the vehicle, the sensor signal being obtained by a sensor mounted on the vehicle;
    identifying the candidate for the road as the road being traveled by the vehicle when the detected lane is included in the candidate; and
    identifying a road including the detected lane as the road being traveled by the vehicle when the detected lane is not included in the candidate.

* * * * *